United States Patent
Boulant

(10) Patent No.: US 7,165,683 B2
(45) Date of Patent: Jan. 23, 2007

(54) LAMELLAR CLARIFIER

(75) Inventor: Alain Boulant, Pornichet (FR)

(73) Assignee: Innova Environnement, Ancenis (FR)

( * ) Notice: Subject to any disclaimer, the term of this patent is extended or adjusted under 35 U.S.C. 154(b) by 97 days.

(21) Appl. No.: 10/493,237

(22) PCT Filed: Oct. 25, 2002

(86) PCT No.: PCT/FR02/03679

§ 371 (c)(1), (2), (4) Date: Apr. 21, 2004

(87) PCT Pub. No.: WO03/035211

PCT Pub. Date: May 1, 2003

(65) Prior Publication Data
US 2005/0000893 A1    Jan. 6, 2005

(30) Foreign Application Priority Data
Oct. 26, 2001  (FR)  .................... 01 13889

(51) Int. Cl.
  *B01D 21/02*  (2006.01)
(52) U.S. Cl. ............... 210/521; 210/532.1; 210/540; 210/522
(58) Field of Classification Search ........... 210/802, 210/521, 522, 532.1, 540, 538
See application file for complete search history.

(56) References Cited

U.S. PATENT DOCUMENTS

| | | | |
|---|---|---|---|
| 2,573,615 A | | 10/1951 | Seailles |
| 3,903,000 A | | 9/1975 | Miura et al. |
| 4,194,976 A | | 3/1980 | Robinsky |
| 4,514,303 A | * | 4/1985 | Moore .................. 210/521 |
| 4,865,753 A | * | 9/1989 | Meurer .................. 210/522 |
| 4,889,624 A | * | 12/1989 | Soriente et al. ........... 210/522 |
| 4,957,628 A | * | 9/1990 | Schulz .................. 210/521 |
| 5,338,449 A | | 8/1994 | Ichiyanagi et al. |
| 5,391,306 A | * | 2/1995 | Meurer .................. 210/521 |

(Continued)

FOREIGN PATENT DOCUMENTS

DE        4302003       8/1994

(Continued)

OTHER PUBLICATIONS

Translation of French Patent 2754733, Apr. 1998.*

(Continued)

*Primary Examiner*—Christopher Upton
(74) *Attorney, Agent, or Firm*—Stevens, Davis, Miller & Mosher, LLP

(57) ABSTRACT

The invention concerns a lamellar clarifier (1) comprising: a) a tank (3) of liquid to be clarified (5); b) means (7) for conveying said liquid (5) into a lower zone (9) of said tank (3); c) means (11) for evacuating said liquid (5) from an upper zone (13) of said tank (3); d) a plurality of clarifying plates (Di) mounted inside said tank (3), defining a plurality of passages extending between said lower (9) and upper (13) zones; and e) means for calibrating said liquid flow (5) between said passages and said upper zone (13). Said calibrating means comprise first tubular members (Ti) mounted inside said tank (3) and integral with said plates (Di), and second tubular members (Tj) arranged substantially staggered relative to said first tubular members (Ti).

17 Claims, 3 Drawing Sheets

Figure 1:
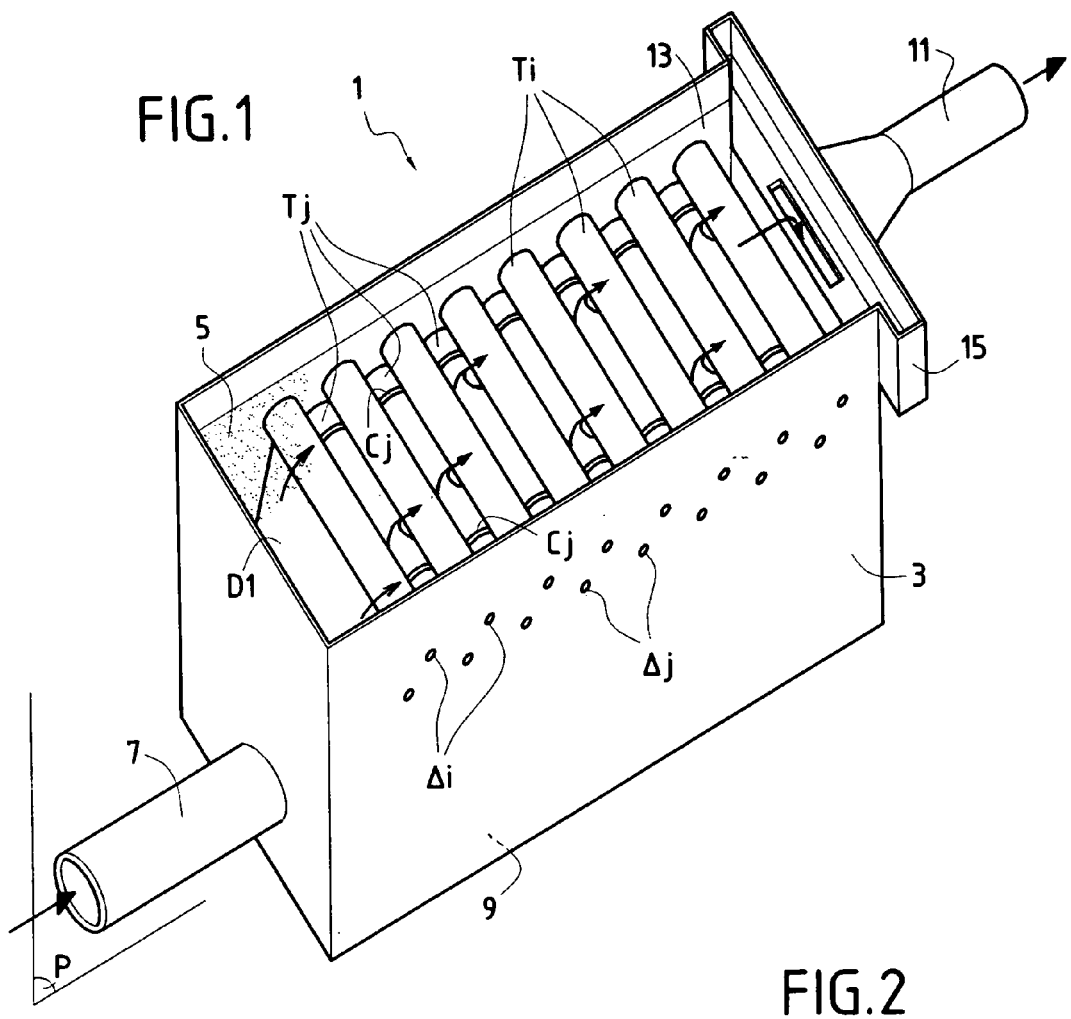

U.S. PATENT DOCUMENTS 5,700,378 A 12/1997 Lee et al.
6,245,243 B1 * 6/2001 Meurer ...................... 210/802

FOREIGN PATENT DOCUMENTS

| DE | 29623598 | 11/1998 |
|----|----------|---------|
| FR | 2688416 | 9/1993 |
| FR | 2754733 | 4/1998 |
| HU | 165164 | 3/1976 |
| HU | 185606 | 12/1986 |

OTHER PUBLICATIONS

Search Report dated Sep. 7, 2004 with English translation.
International Search Report dated Feb. 21, 2003.
International Search Report dated Apr. 28, 2003.
Patent Abstracts of Japan, vol. 1999, No. 5, May 31, 1999, & JP 11 033310 A (Nippon Enbairo Kogyo KK), Feb. 9, 1999, abstract.
US Office Action dated Mar. 14, 2006.

* cited by examiner

LAMELLAR CLARIFIER

The present invention relates to a lamellar clarifier.

The document FR 2 754 733 discloses a lamellar clarifier of the type comprising:
- a) a tank for liquid to be clarified,
- b) means for conducting said liquid into a lower region of said tank,
- c) means for evacuating said liquid from an upper region of said tank,
- d) a plurality of clarifier plates mounted inside said tank, said plates being substantially parallel and regularly spaced to define a plurality of passages between said lower region and said upper region, and
- e) means for calibrating the flow of said liquid between said passages and said upper region, said calibration means comprising:
  - e1) first tubular members mounted inside said tank,
  - e2) second tubular members disposed substantially in a quincunx arrangement relative to said first tubular members, and
  - e3) means for varying the distance between said second tubular members and said first tubular members.

Although it may be used to treat most liquids charged with materials in suspension relatively effectively, a clarifier of the above kind has certain drawbacks.

It will be noted in particular that the clarifier plates, on the one hand, and the first tubular members, on the other hand, must be mounted and demounted separately, which takes a long time and therefore adds to both fabrication and maintenance costs.

An object of the present invention is to provide a clarifier that reduces the above drawbacks.

That object of the invention is achieved with a lamellar clarifier of the type comprising:
- a) a tank for liquid to be clarified,
- b) means for conducting said liquid into a lower region of said tank,
- c) means for evacuating said liquid from an upper region of said tank,
- d) a plurality of clarifier plates mounted inside said tank, said plates being substantially parallel and regularly spaced to define a plurality of passages between said lower region and said upper region, and
- e) means for calibrating the flow of said liquid between said passages and said upper region, said calibration means comprising:
  - e1) first tubular members mounted inside said tank,
  - e2) second tubular members disposed substantially in a quincunx arrangement relative to said first tubular members, and
  - e3) means for varying the distance between said second tubular members and said first tubular members, which clarifier is noteworthy in that said clarifier plates are fastened to said first tubular members.

Thanks to these features, each clarifier plate and the associated first tubular member form a one-piece assembly that can be mounted and demounted quickly, which considerably reduces fabrication and maintenance costs compared to the prior art.

Other features of the clarifier according to the invention are defined in the appended claims.

The present invention also provides a method, as defined in the appended claims, of cleaning the foregoing clarifier.

Figure 2:
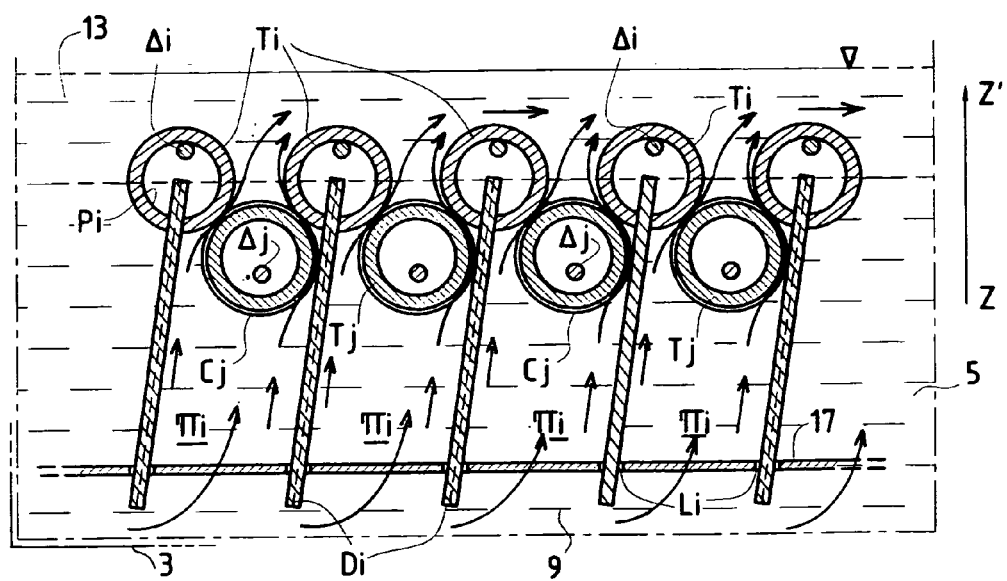
Figure 3:
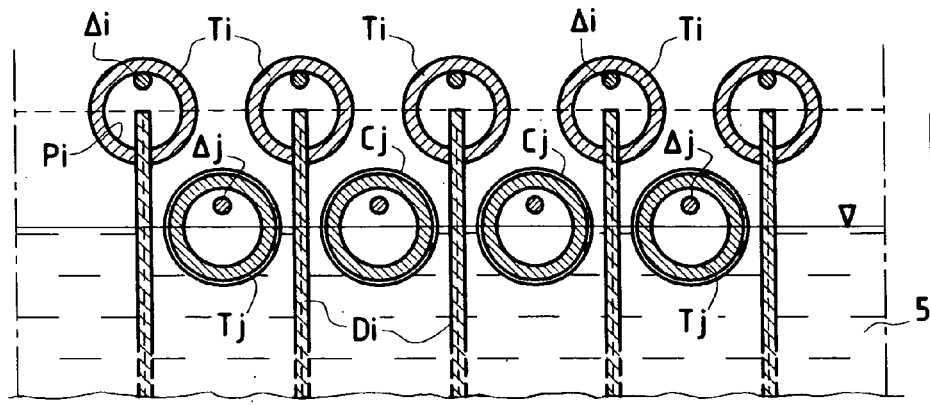
Figure 4:
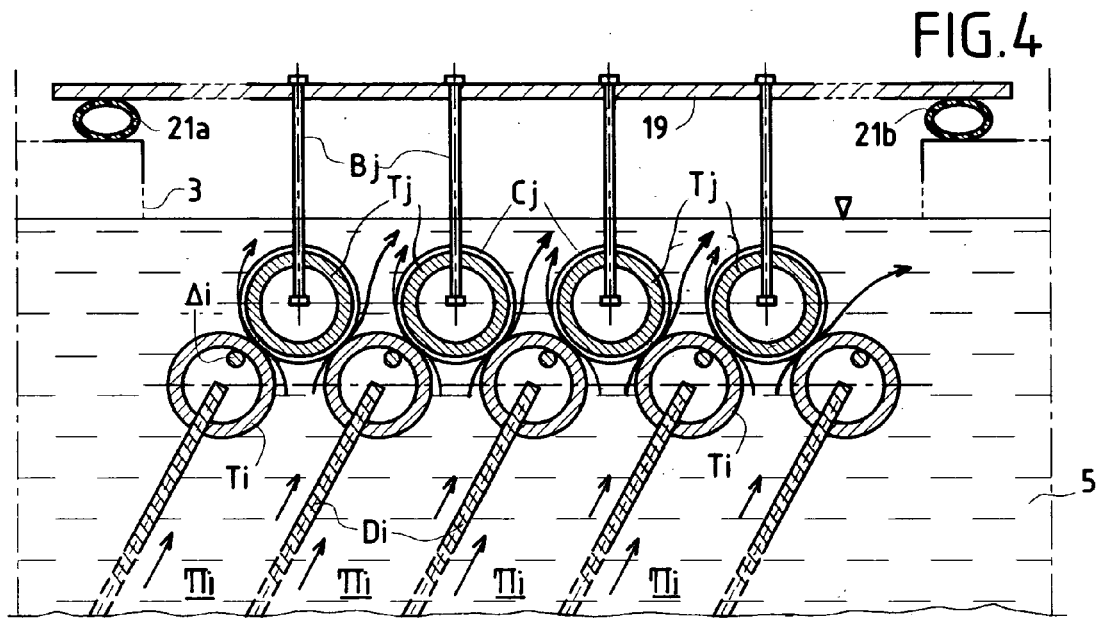
Figure 5:
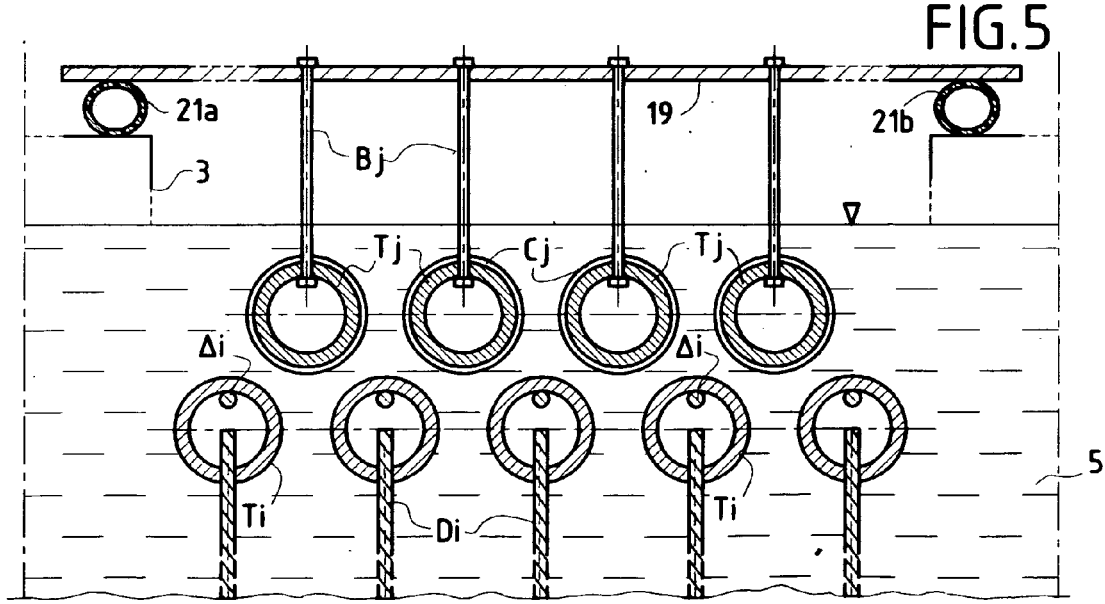
Figure 6:
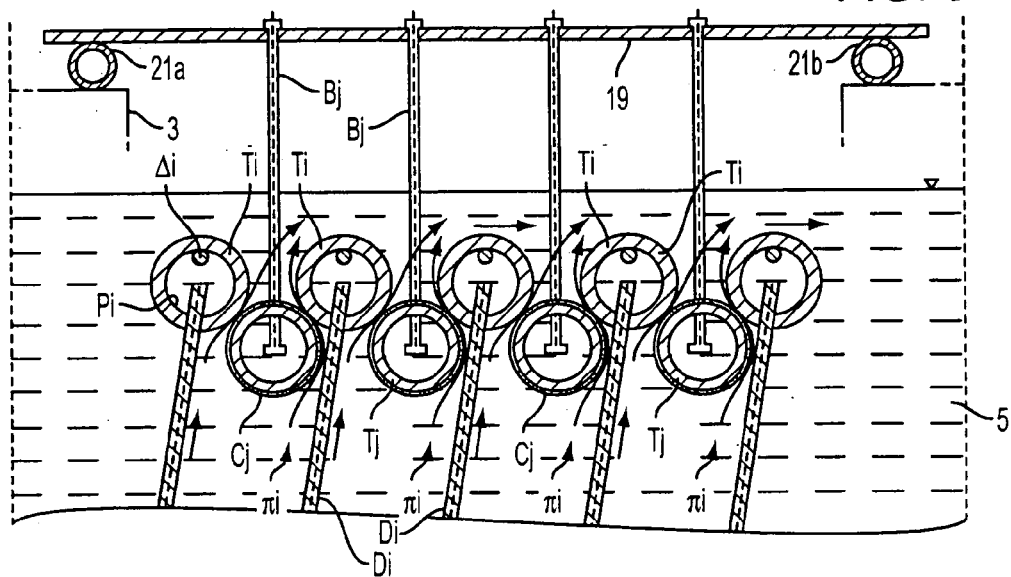
Figure 7:
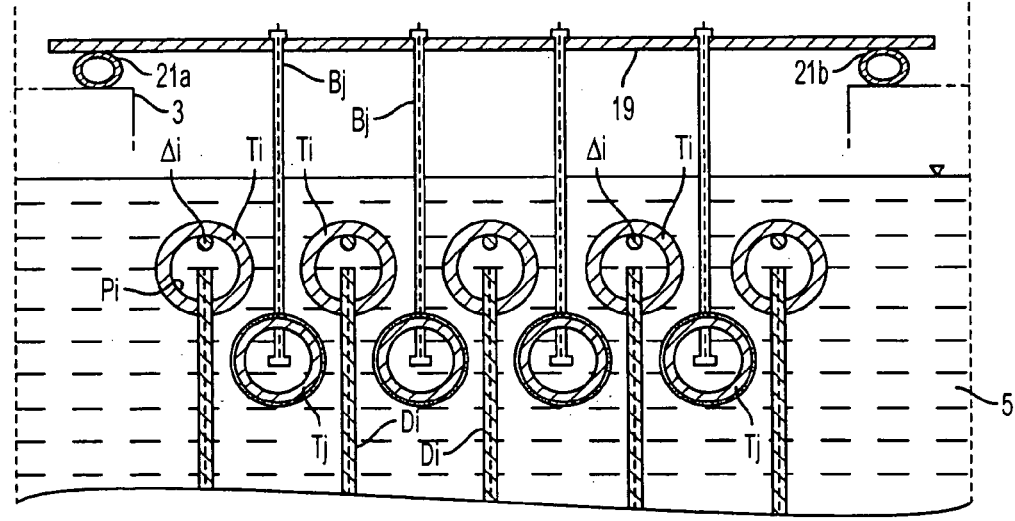

Other features and advantages of the clarifier according to the invention will become apparent on reading the following description and examining the appended drawings, in which:

FIG. 1 is a perspective view of a first embodiment of the clarifier according to the invention, FIG. 2 is a partial view in section on the plane P in FIG. 1 of the clarifier in that figure when it is in an operating configuration, FIG. 3 is analogous to FIG. 2, when the clarifier is in a cleaning configuration, and FIGS. 4 and 5 are respectively analogous to FIGS. 2 and 3, for a second embodiment of the clarifier according to the invention, and FIGS. 6 and 7 are respectively analogous to FIGS. 4 and 5. for a third embodiment of the clarifier according to the invention.

In these figures, the same reference numbers designate identical or analogous units or sets of units.

Refer now to FIG. 1, in which it can be seen that a first embodiment of the clarifier 1 according to the invention comprises a tank 3 of liquid 5 to be clarified having, firstly, a liquid feed pipe 7 discharging into a lower region 9 of the tank 3 and, secondly, a liquid evacuation pipe 11 communicating with an upper region 13 of the tank 3, for example by way of a trough 15 for recovering the liquid 5.

Inside the tank 3 is a plurality of clarifier plates $D_i$, of which only the first clarifier plate $D_1$ can be seen in FIG. 1.

First tubular members $T_i$ are fastened to these plates and second tubular members $T_j$ floating in the liquid 5 under the first tubular members bear against the latter in a substantially quincunx arrangement.

Refer now to FIG. 2 for more details on the arrangement inside the tank 3 of the plates $D_i$, the first tubular members $T_i$, and the second tubular members $T_j$.

As is apparent in that figure, the plates $D_i$ are substantially parallel and regularly spaced to define a plurality of passages $\Pi_i$ between the lower region 9 and the upper region 13 of the tank 3.

The first tubular members $T_i$ are connected to the walls of the tank 3, preferably in a pendular manner, i.e. with the inside walls $P_i$ of each of the members $T_i$ resting on fingers $A_i$ fastened to the walls of the tank 3.

Each tubular member $T_i$ is split lengthwise to receive a plate $D_i$, with conventional fixing means (not shown) such as pins fastening together the tubular members and the plates.

The second tubular members $T_j$ are also connected to the walls of the tank 3, preferably in a pendular manner by means of fingers $A_j$ positioned relative to the fingers $A_i$ in such a manner that the second tubular members $T_j$ are below the first tubular members $T_i$ and bear against the latter in a substantially quincunx arrangement.

Spacer means $C_j$ are preferably disposed between the first tubular members $T_i$ and the second tubular members $T_j$.

As shown in FIGS. 1 to 3, the spacer means preferably comprise pairs of rings threaded over the second tubular members $T_j$ near each of the ends of those members.

These rings maintain a predetermined and identical space between each of the first tubular members $T_i$ and the associated second tubular members $T_j$.

The rings are preferably O-rings made from an elastomer material such as rubber.

The plates $D_i$ may be made of sheet metal, for example, and the tubular members $T_i$, $T_j$ may be made of plastic material, for example.

The tubular members Ti, Tj are preferably closed at their ends, i.e. have two partitions closing the cavity defined by each of these members in the vicinity of its two ends.

It will also be noted that, as can be seen in FIG. 2, there is at least one bar 17, and preferably two parallel bars, in the lower region 9 of the tank 3.

The bars 17 are connected to each plate Di by a sliding pivot type link Li so that purely horizontal displacement of the bars (i.e. displacement thereof parallel to and at a constant distance from the bottom of the tank 3) varies the inclination of the plates Di, for example to change from an "operating" position depicted in FIG. 2, in which the plates Di are inclined to the vertical ZZ', to a "cleaning" position depicted in FIG. 3, in which the plates Di are substantially parallel to that vertical.

Refer now to FIGS. 4 and 5, representing part of a second embodiment of the clarifier according to the invention.

As is apparent in these figures, this embodiment differs from the previous one in that the second tubular members Tj are no longer suspended in a pendular manner from the walls of the tank 3 under the first tubular members Ti, and are instead suspended above the first tubular members in a rigid manner by means of a plurality of arms Bj connected to a manifold 19 above the first tubular members.

The manifold 19 is mobile between an "operating" position depicted in FIG. 4, in which the second tubular members Tj bear in a substantially quincunx arrangement against the first tubular members Ti, and a "cleaning" position depicted in FIG. 5, in which the second tubular members Tj are moved away from the first tubular members Ti.

As represented in FIGS. 4 and 5, it is preferably inflatable membranes 21a, 21b disposed between the manifold 19 and the edges of the tank 3 that lower or raise the manifold into its operating and cleaning positions, respectively.

The operation and the advantages of the clarifier according to the invention are described next.

When the clarifier is operating, the path of the liquid to be clarified is that indicated by the arrows in FIGS. 1, 2 and 4.

As can be seen in FIG. 1, the liquid 5 to be clarified first enters the lower region 9 of the tank 3 via the liquid feed pipe 7.

Then, as can be seen in FIGS. 2 and 4, the liquid 5 to be clarified rises in the passages Πi, after which it infiltrates between the first tubular members Ti and the second tubular members Tj, thanks to the spaces maintained by the rings Cj.

The liquid 5 to be clarified therefore reaches the upper region 13 of the tank 3, after which it is evacuated from the tank via the trough 15 and the pipe 11.

As the liquid 5 flows upward along the plates Di, materials in suspension in the liquid are deposited on the plates Di, and most of these materials then slide toward the bottom of the tank 3.

However, a fraction of these materials remains stuck to the plates Di, forming a deposit known as sludge, making it necessary to halt the clarifying operation periodically and clean the plates Di.

To this end, the bars 17 (see FIG. 2) may first be actuated to move the plates Di to a vertical position, as represented in FIGS. 3 and 5.

Once the plates Di are in the substantially vertical position, some of the sludge collected on the plates falls to the bottom of the tank 3 under its own weight.

In the first embodiment (see FIG. 3), the level of the liquid 5 may then be lowered so that the second tubular members Tj, which float in the liquid, are moved away from the first tubular members Ti in the direction of the bottom of the tank 3, the travel being limited by the fingers Aj, however.

In the second embodiment (see FIG. 5), the membranes 21a, 21b may be inflated to raise the manifold 19 and thereby to move the second tubular members Tj away from the first tubular members Ti in the direction of the top of the tank 3.

This frees up access to the plates Di from the top of the tank 3, so that a water jet may be used to detach the remaining sludge stuck to the plates.

It will be noted that the step of lowering the level of the liquid 5 (first embodiment) or raising the second tubular members Tj (second embodiment) is optional, since the sludge stuck to the plates Di is not difficult to remove, so it may be sufficient to raise the plates to the vertical position to achieve the required cleaning effect.

Conversely, to clean the plates directly with a water jet, it is also possible to lower the level of the liquid 5 (first embodiment) or raise the second tubular members Tj (second embodiment) without first modifying the inclination of the plates Di.

Lumps of material known as floaters may become wedged in the passages Πi during operation of the clarifier according to the invention.

It is not necessary to halt operation of the clarifier to extract these floaters from the clarifier.

This is because, in the first embodiment, it suffices to exert a downward pressure on the second tubular member Tj concerned to remove the wedged floater. Note that downward travel of the tubular member is allowed by its pendular articulation to the walls of the tank 3.

In the second embodiment, it suffices to inflate the membranes 21a, 21b to raise the second tubular members Tj, to remove the wedged floater, and then immediately to deflate the membranes.

FIGS. 6 and 7 are respectively analogous to FIGS. 4 and 5. but in FIGS. 6 and 7. the second tubular muembers Ti are disposed below the first titular members Ti.

As will now be clear, calibration of the flow of liquid to be clarified at the outlet of the passages Πi defined by the clarifier plates Di may be achieved by simply moving the second tubular members Tj closer to the first tubular members Ti, the spacers Cj maintaining the spaces necessary for the liquid 5 to pass through.

The second tubular members Tj being structurally separate from the first tubular members Ti, the first and second members may be moved independently of each other for cleaning the clarifier, which does away with the heavy and costly actuation means of the prior art clarifier.

Depending on the type of cleaning required, the inclination of the plates Di may be modified (and thus the first tubular members Di pivoted) and/or the second tubular members Tj may be moved vertically.

Thanks to the fact that each clarifier plate Di and its associated first tubular member Ti form a one-piece assembly that can be mounted and demounted quickly, fabrication and maintenance costs may be considerably reduced compared to the prior art.

It will be noted that, in both the embodiments described, the pendular articulation of the first tubular members Ti to the walls of the tank 3 reduces the friction that arises on pivoting of the plates Di and thereby minimizes the weight of the structure for actuating the plates, namely the bars 17.

This reduction of friction also makes it possible to use simple sliding pivot type links Li, thanks to which the bars 17 may be moved at a constant distance from the bottom of the tank 3.

It will further be noted that rings Cj of greater or lesser thickness may be chosen, depending on whether the flow of liquid 5 between the passages Πi and the upper region 13 is required to be larger or smaller.

It will also be noted that, in the first embodiment, the fingers Δj avoid the second tubular members Tj falling to the bottom of the tank 3 (into the sludge) when it is emptied.

Of course, the present invention is not limited to the embodiments described and shown, which are provided by way of illustrative and non limiting example.

For example, mounting the first tubular members Ti in a fixed manner to the interior of the tank 3 could be envisaged, in which case the clarifier plate Di would also be fixed.

Thus a variant of the first embodiment could also be envisaged in which the lamellar clarifier would comprise actuation means such as rods adapted to come into contact with the second tubular members and push them toward the bottom of the tank when it is required to clean the clarifier plates.

In this variant, it would no longer be necessary to lower the level of the liquid in the tank to move the second tubular members toward the bottom of the tank.

Thus a variant of the second embodiment could further be envisaged in which the second tubular members would be positioned under the first tubular members and connected to a manifold above the first tubular members, so that to move the second tubular members away from the first tubular members it would be necessary to lower the manifold.

Thus the first and second tubular members having non-circular sections could also be envisaged.

The invention claimed is:

1. A lamellat clarifier coniprising:
a tank that holds liquid to be clarified;
a conductor that conducts said liquid into a lower region of said tank;
an evacuator that evacuates said liquid from an upper region of said tank;
a plurality of clarifier plates mounted inside said tank, said plates being substantially parallel and regularly spaced to define a plurality of passages between said lower region and said upper region;
a calibrator that calibrates the flow of said liquid between said passages and said upper region, said calibrator comprising:
first tubular members m6unted inside said tank and supporting said clarifier plates,
second tubular members arranged in alternating rows with said first tubular members, and
a distance varying unit that varies the distance between said second and first tubular members; and
a spacer disposed between said tubular member that separates said two series of tubular members.

2. The clarifier according to claim 1, wherein said spacer comprises rings threaded onto said first ttzbular members or said second tubular members.

3. The clarifier according to claim 2, wherein two rings are threaded onto each of said second titular members.

4. The clarifier according to claim 2 or 3, wherein said rings are made from an elastomer material.

5. The clarifier according to claim 2 or 3, wherein said rings are O-rings.

6. A lamellar clarifier comprising:
a tank that holds liquid to be clarified;
a conductor that conducts said liquid into a lower region of said tank;
an evacuator that evacuates said liquid from an upper region of said tank;
a plurality of clarifier plates mounted inside said tank, said plates being substantially parallel and regularly spaced to define a plurality of passages between said lower region and said upper region; and
a calibrator that calibrates the flow of said liquid between said passages and said upper region, said calibrator comprising:
first tubular members mounted inside said tank and supporting said clarifier plates,
second tubular members arranged in alternating rows with said first tubular members, and
a distance varying unit that varies the distance between said second and first titular members, wherein:
said second tubular members float below said first tubular members.

7. The clarifier according to claim 6, further comprising an inclination variation unit that varies, together, the inclination of said clarifier plates.

8. The clarifier according to claim 7, wherein said inclination variation unit comprises an actuation bar connected by a sliding pivot type link to said clarifier plates.

9. The clarifier according to claim 1 or 6, wherein said second tubular members are articulated to said tank in a pendular manner.

10. A lemellar clarifier comprising:
a tank that holds liquid to be clarified;
a conductor that conducts said liquid into a lower region of said tank;
an evacuator that evacuates said liquid from an upper region of said tank;
a plurality of clarifier plates mounted inside said tank, said plates being substantially parallel and regularly spaced to define a plurality of passages between said lower region and said upper region; and
a calibrator that calibrates the flow of said liquid between said passages and said upper region, said calibrator comprising:
first tubular members mounted inside said tank and supporting said clarifier plates,
second tubular members arranged in alternating rows with said first tubular members, and
a distance varying unit that varies the distance between said second and first tubular members, wherein:
said second tubular members are suspended rigidly to a plurality of arms which are movable vertically together.

11. The clarifier according to claim 10, wherein said second tubular members are disposed above said first tubular members.

12. The clarifier according to claim 10, wherein said second titular members are disposed below said first tubular members.

13. The clarifier according to claim 11 or 12, further comprising an inflatable membrane that moves said arms vertically.

14. The clarifier according to claim 6 or 10, further comprising a spacer that maintains a predetermined space between said first tubular members and said second tubular members.

15. The clarifier according to any one of claims 1 to 10, wherein said first tubular members and, therefore, said clarifier plates are mobile in said tank.

16. The clarifier according to claim 15, wherein said first tubular members are mounted in said tank in a pendular manner.

17. The clarifier according to any one of claims 1 to 10, wherein said first tubular members are fixed in said tank.

* * * * *